No. 667,566. Patented Feb. 5, 1901.
N. O'NEIL.
CHECKREIN HOLDER.
(Application filed Apr. 21, 1900.)

(No Model.)

Witnesses
Geo. E. Frech.
Chas. R. Wright Jr.

Inventor
Nelson O'Neil,
by A. S. Pattison,
Attorney.

THE NORRIS PETERS CO., PHOTO-LITHO., WASHINGTON, D. C.

UNITED STATES PATENT OFFICE.

NELSON O'NEIL, OF KENT, PENNSYLVANIA.

CHECKREIN-HOLDER.

SPECIFICATION forming part of Letters Patent No. 667,566, dated February 5, 1901.

Application filed April 21, 1900. Serial No. 13,792. (No model.)

*To all whom it may concern:*

Be it known that I, NELSON O'NEIL, a citizen of the United States, residing at Kent, in the county of Indiana and State of Pennsylvania, have invented new and useful Improvements in Checkrein-Holders, of which the following is a specification.

My invention relates to improvements in checkrein-holders, and pertains to a holder constructed and adapted to permit the driver to uncheck the animal and to again check him when desired, all of which will be fully described hereinafter and particularly pointed out in the claims.

The object of my invention is to provide a holder or fastener for checkreins whereby the driver can uncheck the animal from the buggy for the purpose of enabling him to drink or when going uphill and again recheck him from the buggy when desired, thus avoiding the necessity of the driver getting out of the buggy for the purpose of either checking or unchecking the animal, as is required with the ordinary check-hook.

Figure 1:
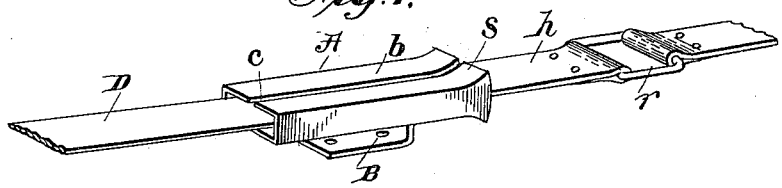
Figure 2:
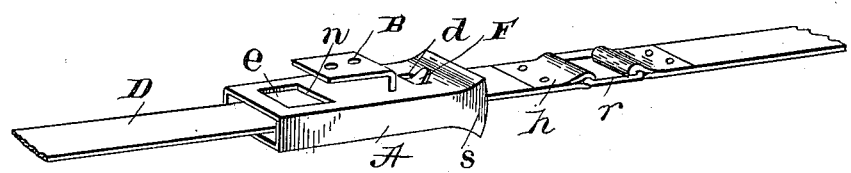
Figure 3:
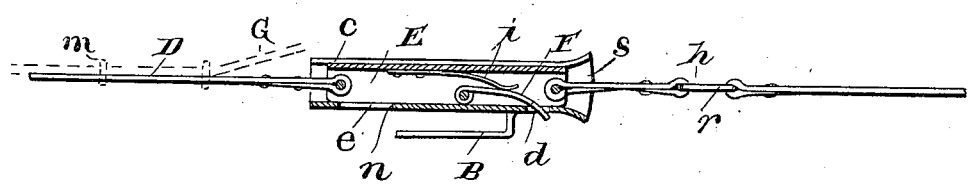
Figure 4:
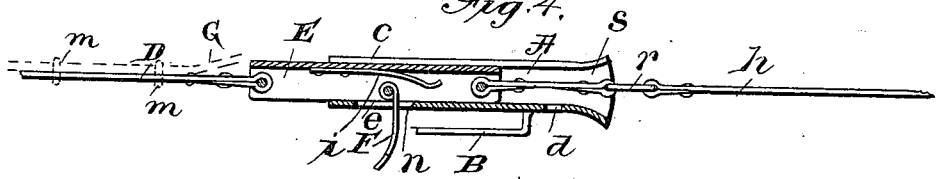
Figure 5:
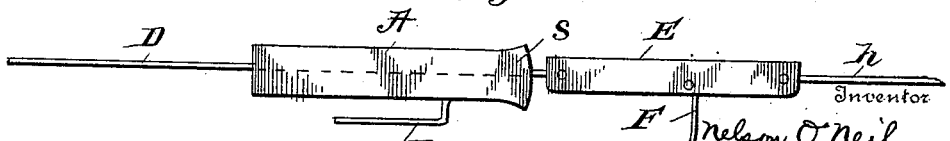

In the accompanying drawings, Figure 1 is a perspective view of my checkrein-holder looking at the same from the top. Fig. 2 is a similar view looking at the same from the bottom. Fig. 3 is an enlarged transverse sectional view of the holder, showing the parts in position for checking the animal. Fig. 4 is a similar view showing the sliding member of the holder drawn backward in the position for unchecking the animal. Fig. 5 is a side view showing the movable member in its position when the animal is unchecked.

Referring now to the accompanying drawings, A is the casing of my checkrein-holding holder, the said casing being of any desired cross-sectional contour, and projecting from the lower side of the casing is an arm B, which serves as means for attaching the holder to the harness-saddle by means of rivets, bolts, or screws.

The upper wall *b* of the case A is preferably provided with a longitudinal slot *c*, whereby the operating rein or strap D may be inserted into the casing edgewise, as will be readily understood. This casing has, preferably, its bottom provided with a locking-aperture *d* and with an aperture *e*, which allows the locking-pawl to drop through and to be carried back in the opposite direction.

Coacting with the casing A is a sliding member E, which is made of a size to permit it to move freely through the casing A, and this sliding member E is provided with a downwardly-projecting pivoted locking-pawl F, which has its extremity or free end reduced, forming abrupt shoulders, said reduced portion adapted to enter the locking-aperture *d* when the sliding member is drawn therein, said shoulders adapted to bear against the bottom of the casing A, and by engagement therewith to lock the sliding member against being drawn forward from the said casing for the purpose of checking the animal, the checkrein *h* being connected with the said sliding member, as illustrated. For the purpose of insuring the locking pawl or member F engaging the locking-aperture *e* I provide the movable member with a spring *i*, which serves to hold the locking-pawl downward in engagement with the inner side of the bottom of the casing A when the sliding member is drawn therein.

The operating strap or rein D is preferably passed through a suitable number of rings *m*, carried by one of the driving-reins G, and extends back to the buggy, where the driver can draw upon the same for the purpose of pulling the sliding member backward within the case A.

In operation when it is desired to uncheck the animal the driver pulls upon the operating rein or strap D, thus pulling the sliding member E backward within the case A a short distance until the locking-pawl F falls through the aperture *e*. The driver then releasing the operating-strap, the animal can lower its head in that the forward wall *n* of the aperture *e* will reverse the position of the locking-pawl and have it extend backward instead of forward, and when the animal is unchecked the sliding member is carried out of the case A and the locking-pawl hangs down. In this position when the driver pulls upon the operating-rein D to draw the sliding member within the case, the end of the case reverses the pawl and carries it in engagement with the spring *i* and in a forwardly-extending position, whereby it will interlock with the walls of the locking-aperture *e* and hold the checkrein in the checked position.

Preferably the forward end of the case A is enlarged outward, as shown at *s*, whereby the sliding member E is readily drawn within the case when the driver pulls upon the rein D for checking the animal.

The spring *i*, in addition to holding the locking-pawl in positive engagement with the locking-aperture *d*, serves to indicate to the driver by a clicking sound when the sliding member has reached the position for checking the animal.

For the purpose of preventing the driver from drawing the sliding member backward through the rear end of the case, I preferably provide the checkrein *h* with a stopping member *r* sufficiently large to prevent it entering the forward end of the case A. This stopping member is here shown as consisting of a ring, though it may be of any other desired form. The stopping member is situated a distance in advance of the locking-tongue slightly greater than the distance between the forward wall of the aperture *e* and the locking-aperture, whereby the rearward pull of the driver cannot be sufficient to draw the sliding member from the rear end of case, and the clicking sound will indicate to the driver in the checking of the animal when the locking tongue or pawl is in engagement with the locking-aperture.

By means of a device as herein shown and described, a driver is enabled at pleasure to uncheck and again recheck his animal without the necessity of getting out of the vehicle, which is necessary with the ordinary check-hook connection.

Having thus described my invention, what I claim, and desire to secure by Letters Patent, is—

1. A device of the character described, comprising a stationary casing having a locking-aperture a movable member adapted to slide in said casing and a pivoted pawl carried by the movable member and adapted to enter the locking-opening on its forward movement and adapted to fall in a vertical position when drawn backward after it has passed the rear end of the supporting-wall of the stationary casing, whereby the pawl is reversed and the movable member adapted to slide through the stationary member, substantially as described.

2. A device of the character described comprising a stationary casing, a movable member adapted to slide therein, a locking-pawl carried by the movable member, the stationary casing having a locking-aperture near one end and a second aperture near the other end of a size to allow the pawl to drop through and reverse itself, substantially as described.

3. A device of the character described comprising a stationary member, a movable member adapted to slide therein, a spring-pressed pivoted pawl carried by the movable member, the stationary member having at one end an opening adapted to receive a portion of the said pawl and an enlarged opening near the other end adapted to allow the pawl to drop through and reverse itself, substantially as described.

4. A device of the character described comprising a stationary member, a movable member adapted to slide therein, said member having a pawl having a reduced outer free end, the stationary casing having at one end an opening to receive the free outer reduced portion of the pawl and near the other end of the casing from the opening *d* is an opening of a size to allow the pawl to drop through, whereby the said member is allowed to be drawn forward and the direction of the pawl reversed.

In testimony whereof I have hereunto set my hand in the presence of two subscribing witnesses.

NELSON O'NEIL.

Witnesses:
H. S. THOMPSON,
M. MAY DAVIS.